United States Patent
Liu et al.

(10) Patent No.: US 6,731,685 B1
(45) Date of Patent: May 4, 2004

(54) METHOD AND APPARATUS FOR DETERMINING A BIT RATE NEED PARAMETER IN A STATISTICAL MULTIPLEXER

(75) Inventors: Vincent Liu, San Diego, CA (US); Siu-Wai Wu, San Diego, CA (US); Hanson On, San Diego, CA (US); Robert S. Nemiroff, Carlsbad, CA (US); Michael Casteloes, Poway, CA (US); Jing Yang Chen, San Diego, CA (US); Rebecca Lam, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 728 days.

(21) Appl. No.: 09/665,373

(22) Filed: Sep. 20, 2000

(51) Int. Cl.[7] .............................. H04N 7/12; H04J 3/18
(52) U.S. Cl. ................ 375/240.14; 370/477; 348/385.1
(58) Field of Search ........................ 375/240.14, 240.02, 375/240.03, 240.12, 240.24, 240.05; 370/412, 468, 537, 465, 477, 538; 358/1.18; 348/385.1, 388.1; 382/239

(56) References Cited

U.S. PATENT DOCUMENTS

| | | | |
|---|---|---|---|
| 5,216,503 A | | 6/1993 | Paik et al. |
| 5,761,398 A | * | 6/1998 | Legall ........................ 358/1.15 |
| 5,929,916 A | * | 7/1999 | Legall et al. .......... 375/240.05 |
| 6,023,296 A | * | 2/2000 | Lee et al. .............. 375/240.05 |
| 6,055,270 A | * | 4/2000 | Ozkan et al. .......... 375/240.03 |
| 6,167,084 A | * | 12/2000 | Wang et al. ........... 375/240.02 |
| 6,493,388 B1 | * | 12/2002 | Wang ..................... 375/240.12 |
| 6,594,271 B1 | * | 7/2003 | Wu et al. .................... 370/412 |

* cited by examiner

Primary Examiner—Gims Philippe
(74) Attorney, Agent, or Firm—Barry R. Lipsitz; Douglas M. McAllister

(57) ABSTRACT

A statistical multiplexer for coding and multiplexing multiple channels of digital television data, or multiple panels of HDTV digital television data. A bit rate need parameter is determined for each encoder in a stat mux group by scaling the complexities of previous pictures of the same and different picture types. Scaling factors based on an activity level, motion estimation score, and number of pictures of a certain type in a GOP, may be used. Moreover, the scaling factors may be bounded based on a linear or non-linear operator to prevent large variations in the factors. An encoding bit rate is allocated to each channel based on its need parameter.

38 Claims, 6 Drawing Sheets

METHOD AND APPARATUS FOR DETERMINING A BIT RATE NEED PARAMETER IN A STATISTICAL MULTIPLEXER

BACKGROUND OF THE INVENTION

The present invention relates to a statistical multiplexer for coding and multiplexing multiple channels of digital television data.

Digital television has become increasingly popular due to the high quality video image it provides, along with informational and entertainment features, such as pay-per-view, electronic program guides, video-on-demand, stock, weather and stock information, Internet hyperlinks, and so forth. Such television data can be communicated to a user, for example, via a broadband communication network, such as a satellite or cable television network, or via a computer network.

However, due to the bandwidth limitations of the communication channel, it is necessary to adjust a bit rate of the digital video programs that are encoded and multiplexed for transmission in a compressed bit stream. A goal of such bit rate adjustment is to meet the constraint on the total bit rate of the multiplexed stream, while also maintaining a satisfactory video quality for each program.

Accordingly, various types of statistical multiplexers have been developed that evaluate statistical information of the source video that is being encoded, and allocate bits for coding the different video channels accordingly. For example, video channels that have hard-to-compress video, such as a fast motion scene, can be allocated more bits, while channels with relatively easy to compress scenes, such as scenes with little motion, can be allocated fewer bits.

In MPEG-2 digital video systems, the complexity of a video frame is measured by the product of the quantization level (QL) used to encode that frame and the number of bits used for coding the frame (R). This means the complexity of a frame is not known until it has been encoded. As a result, the complexity information always lags behind the actual encoding process, which requires the buffering of a number of frames prior to encoding, thereby adding expense and complexity. This kind of look-behind information may be avoided by using some pre-encoding statistics about the video, such as intra-frame activity, or motion estimation (ME) scores as a substitute for the traditional complexity measure. However, the relationship between the pre-encoding statistics of a video frame and the complexity of that frame may not be direct, and sometimes the relationship may change due to the changing subject matter of the source video.

Accordingly, there is a need for an improved statistical multiplexing system. Such a system should employ a number of individual encoders that encode data from a number of incoming channels of source video data. This data may be obtained from a storage media, live feed, or the like.

The system should dynamically allocate bits to the individual encoders to encode frames of video data from the channels.

The system should use pre-encoding statistics of the source video frames that are closely related to the complexity of the frames, and which account for changing content in the source video.

The system should be usable with essentially any type of video data, including high-definition (HD) and standard-definition (SD) television (TV).

The present invention provides a system having the above and other advantages.

SUMMARY OF THE INVENTION

The present invention relates to a statistical multiplexer for coding and multiplexing multiple channels of digital television data.

Bandwidth is dynamically allocated among a number of variable bit rate (VBR) video services that are multiplexed to form a fixed bit rate transport bit stream.

Since a video service's need for bandwidth varies with the amount of information in the video content, it is more efficient for bandwidth usage to allocate the total available bandwidth dynamically among the services according to the need of the individual service instead of using a fixed allocation.

The present invention achieves this goal by providing a number of advantageous features, including:

1. Using the coding complexity of previous frames (in encoding order) to estimate a need parameter for a current frame.
2. Using a relative change in the intra-frame activity of the picture, calculated at least one frame time ahead of encoding, to adjust the need parameter of I-frames.
3. Using a relative change in a motion estimation score of the picture, calculated one frame time ahead of encoding, to adjust the need parameter of P- and B-frames.
4. Using scene change information to adjust the need parameter.
5. Boosting the need parameter for scenes where artifacts can be more visible, such as low spatial complexity or slow motion scenes.
6. Boosting the need parameter when the number of bits generated in the previous frames exceeds the available bit budget.

The stat mux system includes three distinct parts:

1) The collection of visual characteristics and complexity information for individual video channels and a need parameter is generated for each video channel to indicate how difficult it is to compress that channel. This process is repeated once per frame and it is done by the individual single-channel encoders (which could be SD and/or HD).

2) The most up-to-date need parameters from all the video channels are collected by a quantization level processor (QLP), or rate control processor. The rate control processor assigns an encoding bandwidth to each video channel in the form of an encoding bit rate. Each channel receives a different encoding bit rate based on its need parameter in relation to the needs of all the other channels. The encoding bit rate is used to control the video encoding of individual channels. The rate control processor also assigns transmission bit rates to the channels, which determine how many bits are sent by each video channel to a decoder.

3) The single-channel encoder uses the encoding bit rate it is given to perform video compression. The primary task here is a rate control function, which involves using the encoding bit rate and the relative complexities of different frame-types (i.e., I, B and P types) to assign a target bit budget for each frame it is about to encode.

A particular method for allocating bits in a statistical multiplexer for coding a plurality of channels of video data sources comprising respective video pictures, includes the step of: for each channel, obtaining a bit rate need parameter for a current picture, which has an associated picture type, by scaling at least one complexity measure that is based on at least one previous picture of the same type, and by scaling at least one complexity measure that is based on at least one previous picture of a different type. An encoding bit rate is allocated for coding the current picture of each channel according to the bit rate need parameter thereof.

Note that the pictures can be, e.g., frames or fields.

A corresponding apparatus is also presented.

DETAILED DESCRIPTION OF THE INVENTION

The present invention relates to a statistical multiplexer for coding and multiplexing multiple channels of digital television data.

Figure 1:
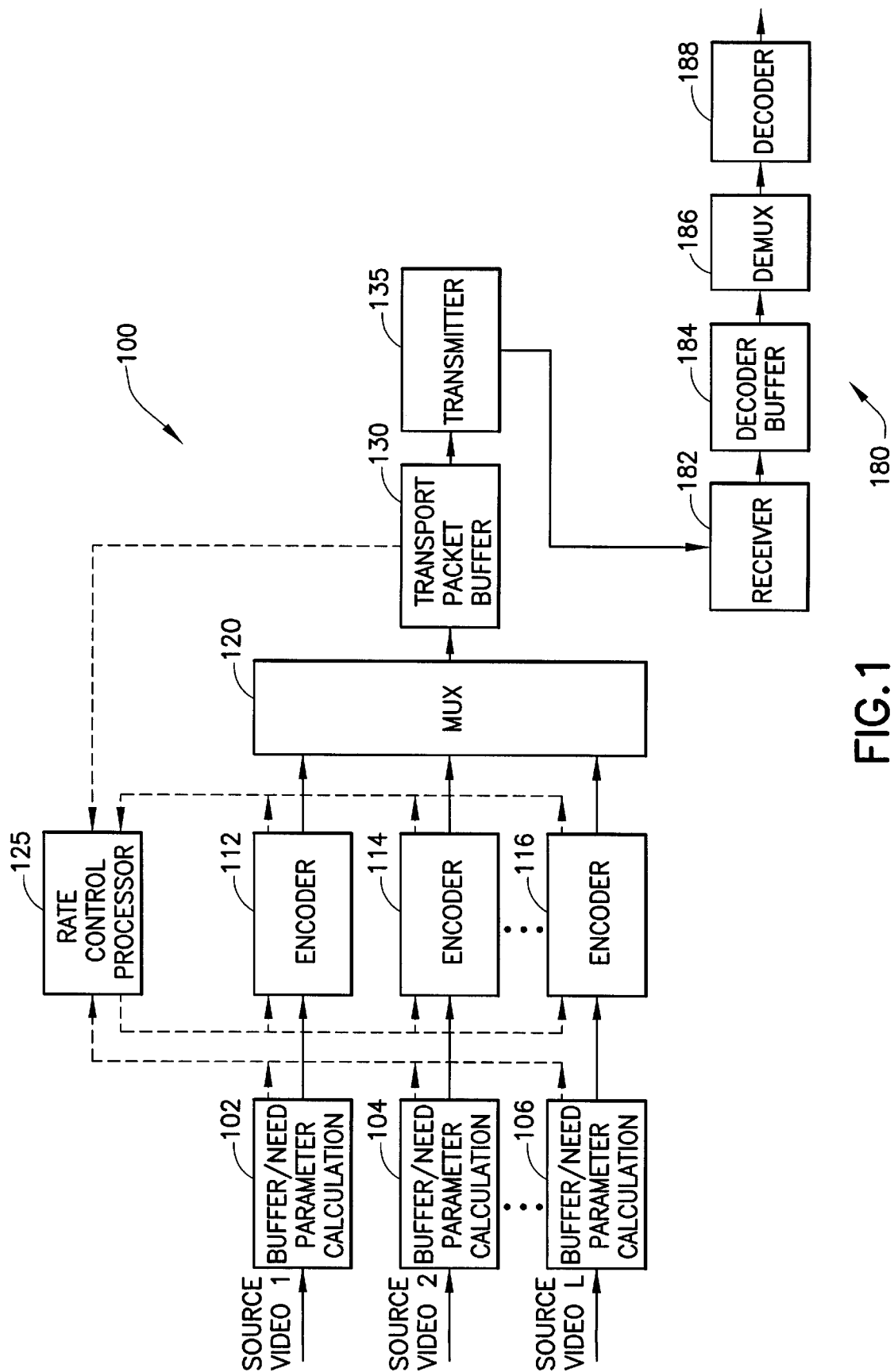
FIG. 1 illustrates a statistically multiplexed multi-channel encoding system in accordance with the present invention.

FIG. 1 illustrates a statistically multiplexed multi-channel encoding system in accordance with the present invention.

The encoding system 100 includes L buffer/need parameter calculation functions 102, 104, . . . , 106 that receive corresponding uncompressed source video inputs. The functions 102, 104, . . . , 106 provide the need parameter data to a rate control processor 125, which in turn provides a corresponding encoding bit rate allocation to each of the encoders 112, 114, . . . , 116. The encoders may provide feedback information to the rate control processor regarding the actual encoding bit rate. The encoded data is provided to a mux 120 to provide a multiplexed bitstream, then to a transport packet buffer 130, and to a transmitter 135 for transmission across a channel.

The rate control processor 125 may receive a fullness signal from the transport packet buffer 130.

At a decoding side 180, a receiver 182, decoder buffer 184, demux 186, and decoder 188 are provided to output a decoded video signal, e.g., for display on a television.

Figure 2:
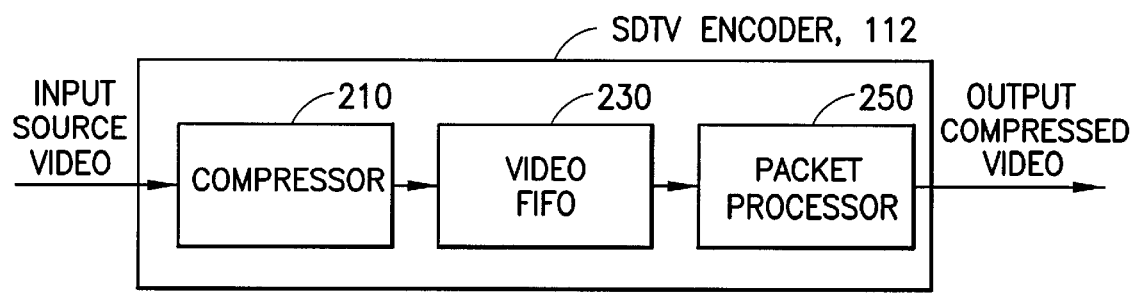
FIG. 2 illustrates an encoder for standard definition television data in accordance with the present invention.

FIG. 2 illustrates an encoder for standard definition television.

The encoder 112, which is an example one of the encoders 112, 114, . . . , 116 of FIG. 1, encodes a single channel of input data, and includes a compressor 210 that performs conventional data compression, including motion compensation (for P- and B-frames), discrete cosine transform (DCT) and quantization. A video first-in, first-out (FIFO) buffer 230 temporarily stores the compressed data, and a packet processor 250 forms packets of the compressed data with appropriate header information, e.g., according to the MPEG-2 or other video standard.

Figure 3:
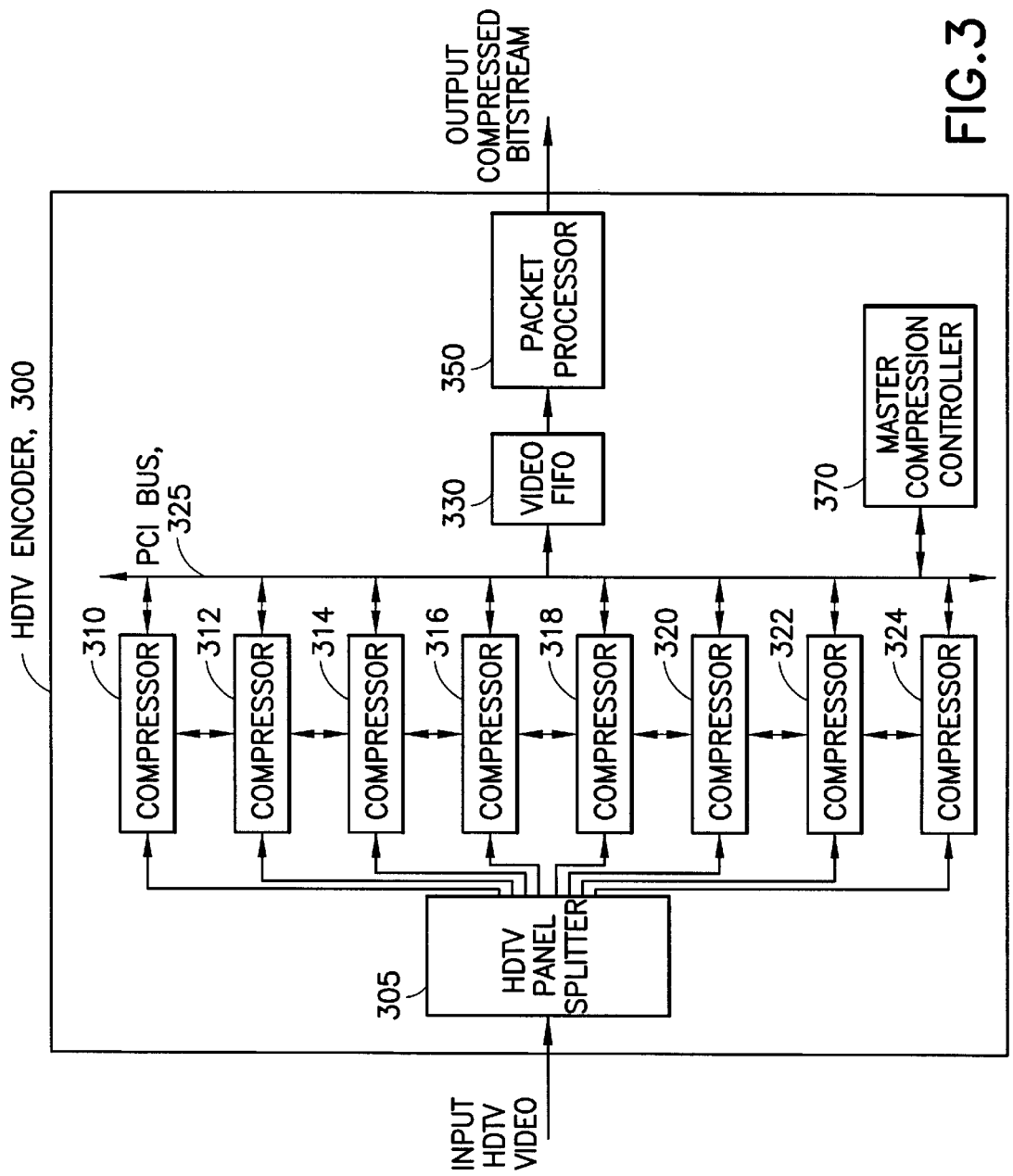
FIG. 3 illustrates an encoder for high-definition television data in accordance with the present invention.

FIG. 3 illustrates an encoder for high-definition television.

The encoder 300 encodes a single channel of input data. However, a panel splitter 305 divides up a video frame such that different sub-regions, or panels, of the frame are routed to respective different compressors 310–324. Eight compressors are shown as an example only. Typically, the same sub-region of successive frames is assigned to the same compressor.

A master compression controller (MCC) 370 controls the compression of the data at each compressor via a peripheral component interconnect (PCI) bus 325, and the compressed data is output to a video FIFO 330 for temporary storage. The compressed data is formed into packets for transport at a packet processor 350.

A encoding bit rate need parameter for the HDTV channel is determined by the MCC 370 by summing a need parameter for each of the panel compressors. Other statistical information, such as motion estimation scores and the like, are also summed from each compressor Note that it is possible to combine both SDTV and HDTV encoders in a single stat mux group. In this case, the encoder 300 is an example one of the encoders 112, 114, . . . , 116 of FIG. 1. For example, one HDTV encoder may be combined with two or three SDTV encoders in a stat mux group.

Overview

A key part of a statistically multiplexed multi-channel encoding system of the invention is the calculation of the need parameter.

The visual characteristics and complexity information regarding the source video are collected and condensed into a single parameter, which is referred to as the "need parameter". A need parameter is calculated for each video channel, and is updated once per frame whenever a new video frame is processed by the corresponding single-channel encoder 112, 114, . . . , 116. Optionally, the need parameter can be updated more often, such as multiple times per frame. Moreover, for field-picture mode, the need parameter can be updated once per field.

In accordance with the invention, a need parameter is determined for each frame by scaling complexity information from previous frames of the same and different picture types. For example, the complexity (QL×R) for a past encoded I-frame is scaled (multiplied by) by a scale factor:

(intra-frame activity of current frame/intra-frame activity of past I-frame).

This provides an estimate of the current frame's complexity if it is to be intra-frame coded. Advantageously, this avoids the need to know the exact relationship between the pre-encoding statistics (e.g., the intra-frame activity) and the true complexity of the current frame, which can only be determined following encoding (post-encoding). This scaled I-frame complexity, $(Act(n)/Act(m)) \cdot X_I(m)$, is found in equations (2), (3), (8) and (9), discussed below. Frame (n) refers to the current frame, and (m) refers to the last encoded I-frame; Act( )'s are the intra-frame activities, and $X_I(m)$ is the complexity of the last encoded I-frame.

Similarly, the P-frame coded complexity for the current picture may be estimated from:

(the average complexity of past P-frame encoded pictures)×(ME score of current frame/average ME score of past P-frames).

The above scale factor works if the motion estimation performed on the current frame is of the P-frame type, as in the $2^{nd}$ term of equation (2).

To estimate the B-frame coded complexity for the current picture, apply the scale factor:

(ME score of current frame/average ME score of past B-frames)

to the average ME score of past B-frames, assuming that a B-type motion estimation is performed on the current picture. However if the current frame uses P-type motion estimation, then an extra scaling factor of kappa, κ is added to the above formula since the ME scores of past B-frames are of the B-type:

[κ·($ME_P$ score of current frame/average $ME_B$ score of past B-frames)]

This is exactly the case for the third additive term in equation (2). However, from experiments for many steady scenes, the above scale factor is close to unity in most cases. Thus equation (2) is simplified to equation (13). The non-linear operator $\nabla$ and the linear operation of "< >", which denotes a bounded value, can optionally be used to prevent large swings in the scale factors. In the case of a scene change, the factor κ×(ME score of current frame/average ME score of past B-frames) does not remain close to unity. It is substituted with (ME score of current frame/average ME score of past P-frames) instead, so eqn. (2) is simplified into eqn. (8) in the case of a scene change. With the non-linear and linear operators added, eqn. (8) becomes eqn. (16).

The above discussion assumes that the current frame is to be coded as P-frame, with P-type motion estimation. Thus, eqn. (2) and its derivatives, eqns. (8), (13) and (16) apply.

If the current frame is to be coded as B-frame, then the ME score for the current frame is of the B-type. To estimate the P-frame complexity for the current picture, use the scale factor:

$$[(1/\kappa) \cdot (ME_B(n)/\text{average } ME_P \text{ scores of past P-frames})]$$

multiplied with the average complexity of past P-frames, as seen in the second additive term of eqn. (3). Again, for the case of no scene change, the above scale factor may be replaced with unity, and eqn. (3) simplifies to eqn. (14). In the case of a scene change, the above factor is replaced with (ME score of current frame/average ME score of past B-frames), which leads to eqn. (9) and its operator-bounded equivalent in eqn. (15).

To summarize, to estimate the complexities for the current frame before encoding it, use scaled versions of the complexities of past encoded frames. The various scaled complexities are combined through the use of a weighted summation to form a basis for the need parameter. The weights $N_P$ and $N_B$ are, respectively, the number of P-frames and the number of B-frames in a GOP.

After the weighted sum is calculated, several subjective visual quality adjustments can optionally be used, including $FADE_{adj}$ to account for the presence of fading in the source material, $APL_{adj}$ to account for low brightness level (average pixel level) in the picture, and $B_{adj}$ to account for the encoder's buffer fullness. One more visual quality adjustment, $Low\_motion_{adj}$, may be added which adjusts the need parameter for a low amount of movement in the video scene. Thus, adjustments can be made to the need parameter when these special cases are detected. The optimal amount of adjustment can depend on the implementation. The detection of such scenes may be based on the scene scores computed for scene change detection, which is the sum of absolute differences between two consecutive fields of the same parity (odd field to odd field, or even field to even field). A similar technique can be used based on the differences between two consecutive frames in a progressive video application.

The reasoning behind these subjective visual quality adjustments is that for each of these scenes: fading, low luminance level or low amount of movement, the eyes are more sensitive to any compression artifacts. As a result, it is desired to adjust the need parameter upward in an attempt to gain more encoding bandwidth allocation from the rate control processor 125.

Discussion

In the following description of a stat mux, each video service is assumed to provide a picture complexity measure, such as an ME score or activity level, to the rate control processor 125, which handles the tasks of allocating bandwidth for each television service provider (TSP), e.g., channel, and modulating the transmission rates for each channel. In an encoder with look ahead capability, the ME score can be replaced by other measurements such as the actual number of bits coded under a constant quantization level (QL). See the section below entitled "Discussion of ME scores".

For the high-definition encoder that processes multiple panels of a frame in parallel, the encoders 112, 114, . . . , 116 collect the ME scores from all the panels and compute the sum along with other parameters such as average pixel level (APL), picture resolution, frame rate, frame type (I, B or P) and total intra-frame activity. It also keeps a record of the sizes and average QL for past frames. Based on the information available, plus the look ahead parameters from scene change, fade and film detection, the MCC 370 can derive a need parameter for that video channel.

As the rate control processor 125 receives an updated need parameter from a buffer/need parameter calculation function 102, 104, . . . , 106, it reallocates the bandwidths for all the video services based on the latest information. The bandwidth allocation is sent back to each encoder 112, 114, . . . , 116 in the form of an encoding bit rate. Moreover, the rate control processor 125 uses the bandwidth allocation to compute bit budgets for encoding. It keeps an approximate video buffering verifier (VBV) model, such as is know from the MPEG standard, to ensure that each frame is encoded within acceptable size limits.

Note that the VBV model is only approximate because the actual transmission rate changes that occur at the decode time of a frame cannot be precisely modeled in advance, at the time of encoding. The rate control processor 125 keeps a bit accurate model of the decoder buffer 184, and if it is given the sizes of each encoded frame along with the decoding time stamp (DTS), the min. and max. limits on the transmission rate can be calculated and used before a transmission rate change is issued. As known from the MPEG standard, a DTS is a field that is present in a PES packet header that indicates the time that an access unit (e.g., picture) is decoded in a system target decoder.

Since all the video services need not be frame-synchronized, the encoding bit rates and transmission rates are updated as frequently as the rate control processor can handle.

Calculation of Need Parameter

In accordance with the invention, the current frame activity, average frame activity, current frame ME scores, and average frame ME scores, are prefrably directly applied in the calculation of the need parameter. Optionally, a table look-up may be used.

The need parameter calculation functions 102, 104, . . . , 106 calculate the need parameter according to the current picture type in the beginning of a new frame, and pass the need parameter to the rate control processor 125 no later than, e.g., two quantization level/bit rate (QL/BR) cycles before the start of the slice encoding at the encoder 112, 114, . . . , 116. This lead time ensures the rate control processor 125 has enough processing time for bandwidth allocation.

Let $NP_{I/P/B}(n)$ (see eqns. (1) (2) (3)), be the need parameter for the current frame to be coded. The subscript denotes the possible current frame type, e.g., I, P or B. $NP_I(n)$ is calculated by the need parameter calculator when the current frame to be encoded is an I frame, and is provided to the rate control processor 125 to determine a bit rate allocation for the corresponding encoder. For example, bits can be allocated for coding each current frame using the ratio of each frame's need parameter to the sum of all need parameters of all current frames in the different channels, where the ratio is multiplied by the total available channel bandwidth.

Similarly, $NP_P(n)$ and $NP_B(n)$ are calculated by an associated one of the need parameter calculators when the current frame to be encoded is a P- or B-frame, respectively.

$F_{adj}$ is a frame rate adjustment multiplier, such that $F_{adj}=1/\text{frame\_rate}$, where the frame_rate may be, e.g., 24 or 30 frames/sec. The terms, $\{\cdot\}$, in eqns. (1), (2) and (3) are for stat mux performance tuning, where $APL_{adj}$ is a function of average pixel level (e.g., the average luminance for the current frame) and $B_{adj}$ is function of encoder buffer level. The APL adjustment factor can be set to: $APL_{adj}=(3+x)/(1+x)$ where x=(average pixel level of current frame)/(pixel level of dark scene). The common dark scenes are found to have a pixel level around twenty-six.

For scenes with a low amount of movement, a need parameter adjustment factor of 1.5 may be used. For scenes with fades, an adjustment factor of 2.0 may be used.

In addition, the terms, [·], in eqns. (2) and (3) are taken into account only when the frame to be coded is one of the first three frames immediately after a scene change I-frame. They should be treated as unity otherwise.

Furthermore, let $X_I(m)$ be the complexity for the current I-frame (i.e., the I-frame of the current group of pictures—GOP—to be encoded). That is, when the current frame is not an I-frame, $X_I(m)$ is the complexity of the I-frame in the GOP to which the current frame belongs. $X_I(m-1)$ is the complexity of the I-frame from the previous group of pictures (GOP). When the current frame to be encoded is an I-frame, its complexity of course is not available, so $X_I(m-1)$ is used. However, when the current frame to be encoded is a P- or B-frame, $X_I(m)$ is available since an I-frame is the first frame of a GOP, so an I-frame will have already been encoded by the time a P- or B-frame is to be encoded.

Generally, I-frames are relatively far apart compared to P- or B-frames, so the complexity for a current I-frame is obtain by scaling only the most recent I-frame. However, conceivably an average of two or more previous I-frames can be used to provide the complexity for a current I-frame, e.g., for short GOP lengths or relatively slowly-changing video scenes. Also, when an average activity level or ME score is used in calculating the need parameter, e.g., for P-and B-frames, this can be a weighted average, where the more recent frames are weighted higher.

$N_P$ and $N_B$ are the nominal numbers of P and B-frames to be coded in the current GOP (i.e., the total number of frames of that type in a GOP). $\overline{X}_P$ (eqn. (4)), and $\overline{X}_B$ (eqn. (5)) are average complexities for a number of-previous P- and B-frames, respectively, which can be in the same and/or different GOP as the current frame. The overbar "" denotes an average. Eqn. (6) defines the complexity for the i-th coded frame with respect to the frame type: I, P, or B. $\overline{Q}_{I/P/B}(i)$ is the average quantization scale for a frame (e.g., for SDTV). When multiple panels of a frame are encoded in parallel (e.g., for HDTV), the average quantization scale for a frame is given by dividing the sum of the panel quantization scales of the i-th frame over the number of macroblocks coded in the i-th frame. $BC_{I/P/B}(i)$ is the bit count over the i-th frame. Each encoder performs a bit count on a frame while the frame is being encoded.

In eqn. (1), Act(n) is the current frame activity, and $\overline{Act}$ (eqn. (7)), is the estimated mean activity over a number of previous frame. The first term in eqn. (1), $Act(n)/\overline{Act}$, is to account for the instant change in current frame activity, and the second term, in parentheses, represents the estimated long-term complexity. During steady scene or still frames, the first term should have a value very close to unity, in which case the value of the need parameter $NP_I(n)$ is dominated by the second term.

Furthermore, during a scene change, the first term should reflect how much the new scene (after the scene change) deviates from the old scene (before the scene change). Therefore, the need parameter is properly scaled by the first term, $Act(n)/\overline{Act}$.

For brevity, the composite term $$ADJ=F_{adj} \cdot \{APL_{adj}\} \cdot \{B_{adj}\} \cdot \{FADE_{adj}\} \text{ is used.}$$

$$NP_I(n) = \frac{Act(n)}{\overline{Act}} \cdot (X_I(m-1) + N_P \cdot \overline{X}_P + N_B \cdot \overline{X}_B) \cdot ADJ \quad (1)$$

$$NP_P(n) = \quad (2)$$
$$\left( \frac{Act(n)}{Act(m)} \cdot X_I(m) + \frac{ME_P(n)}{\overline{ME_P}} \cdot N_P \cdot \overline{X}_P + N_B \cdot \overline{X}_B \cdot \left[ \kappa \cdot \frac{ME_P(n)}{\overline{ME_B}} \right] \right) ADJ$$

$$NP_B(n) = \quad (3)$$
$$\left( \frac{Act(n)}{Act(m)} \cdot X_I(m) + N_P \cdot \overline{X}_P \left[ (1/\kappa) \cdot \frac{ME_B(n)}{\overline{ME_P}} \right] + \frac{ME_B(n)}{\overline{ME_B}} N_B \cdot \overline{X}_B \right) ADJ$$

$$\overline{X}_P = \frac{1}{N} \cdot \sum_{i=n-N}^{n-1} X_P(i); N = 4, n \text{ denotes current frame} \quad (4)$$

$$\overline{X}_B = \frac{1}{N} \cdot \sum_{i=n-N}^{n-1} X_B(i); N = 4, n \text{ denotes current frame} \quad (5)$$

$$X_{I/P/B}(i) = \overline{Q}_{I/P/B}(i) \cdot BC_{I/P/B}(i) \quad (6)$$

$$\overline{Act} = \frac{1}{N} \cdot \sum_{i=n-N}^{n-1} Act(i); N = 4, n \text{ denotes current frame} \quad (7)$$

In eqns. (2) and (3), the multiplier, $ME_{P/B}(n)/\overline{ME}_{P/B}$, is used for an analogous reason as the first term in eqn. (1), $Act(n)/\overline{Act}$. Namely, the current frame ME score, $ME_{P/B}(n)$, accounts for an instant change in motion estimation. $\overline{ME}_{P/B}$ is the estimated mean of the ME score of the P- or B-frame respectively. The ratio, Act(n)/Act(m), multiplying $X_I(m)$ is to weight the influence of the complexity of the I-frame by the similarity in activity measurements as the slice encoding moves further into a GOP. Act(n) is the activity measurement of the current P or B-frame, and Act(m) is the activity measurement of the I-frame within the current GOP.

During steady scene or still frame, the multipliers, $ME_{P/B}(n)/\overline{ME}_{P/B}$ and Act(n)/Act(m), in (2) and (3) have values close to unity. Then, given the terms in [·] equal to unity, the adjustment of the need parameter is either dominated by $N_P \cdot \overline{X}_P$ or $N_B \cdot \overline{X}_B$ depending on whether the current frame to be coded is a P- or B-frame, respectively. During the scene change, and when the current frame is within the first three frames immediately after an I-frame, Act(n)/Act(m) should still stay very close to unity. However, the terms in brackets "[·]" are no longer unity. In (2), $\kappa \cdot ME_P(n)$ is to estimate $ME_B(n)$ when the current frame to be coded is a P-frame. In (3), $(1/\kappa) \cdot ME_B(n)$ is to estimate $ME_P(n)$ when the current frame to be coded is a B-frame, where $\kappa = \overline{ME}_B/\overline{ME}_P$. Thus, by substituting $\kappa$ with $\overline{ME}_B/\overline{ME}_P$ into (2) and (3), two new Need Parameter equations, (8) and (9), are obtained for the first three P/B-frames immediately after the scene change (SC) I-frame. Once slice encoding passes the first four frames of a GOP, the ratio, Act(n)/Act(m), may vary depending on how close the current activity is to the I-frame activity. The influence of the I-frame complexity is thereby adjusted.

$$NP_P(n)_{sc} = \left( \frac{Act(n)}{Act(m)} \cdot X_I(m) + \frac{ME_P(n)}{\overline{ME}_P} \cdot (N_P \cdot \overline{X}_P + N_B \cdot \overline{X}_B) \right) ADJ \quad (8)$$

-continued $$NP_B(n)_{sc} = \left(\frac{Act(n)}{Act(m)} \cdot X_I(m) + \frac{ME_B(n)}{\overline{ME_B}} \cdot (N_P \cdot \overline{X}_P + N_B \cdot \overline{X}_B)\right) ADJ \quad (9)$$

It is desirable to avoid rapid changes in the need parameter. The dynamic range of the ME score is quite large. The ME score is zero during still frames, and in the low 200,000's for a 1920×1080 interlaced (I) pixel picture with minimum motion. The large dynamic range can make the need parameter described in eqns. (2), (3), (8) and (9) unstable. First, if the ME score stays very low, e.g., approximately one, for a period of time, then a small variation in the instant ME score can cause undesirable large swings in the need parameter. Second, the need parameter may become infinite as the picture transitions out of the still frames, i.e., $\overline{ME}_{P/B}=0$ and $ME_{P/B}(n)>0$, $(ME_{P/B}(n)/\overline{ME}_{P/B})\rightarrow\infty$. Similar problems can be found in eqn. (1), as the picture transitions out of the flat field, since the frame activity is zero for flat field. A flat field is a video frame that shows a blank screen with a "flat" (i.e., constant) luminance level.

However, since the other terms in eqns. (1), (2), (3), (8) and (9) are already bounded, the problem with need parameter stability can be simplified to that of finding the upper and lower bounds of the ratios. Let us impose two constraints on the need parameter for finding these bounds, such that $NP_{I/P/B}(n)<<\infty$ at all times, and large swings in the need parameter are also prevented.

Without losing generality, eqn. (2) is used as an example in the following paragraph to find the upper and lower bounds for the ratio. The derivation of the bounds for eqn. (2) is also applicable to eqns. (1), (3), (8) and (9).

One solution is to impose a non-linear operator. $\nabla$, eqn. (10), to the numerator and denominator.

$$\nabla \cdot \Phi = \begin{cases} \chi; \Phi \leq \chi \\ \Phi; \Phi > \chi \end{cases} \quad (10)$$

Let $\chi$ be an arbitrary positive number. Then, the ratio $\nabla \cdot ME_P(n)/\nabla \cdot \overline{ME}_P$ is bounded as follows:

$$0 < \frac{\nabla ME_P(n)}{\nabla \overline{Me_P}} < \frac{\max(ME_P(n))}{\chi}.$$

In addition, choosing a large enough $\chi$ can reduce large swings in the need parameter when both the instant and the average ME scores are small in magnitude. Therefore, the two constraints are met with the additional non-linear operation as well.

Furthermore, one can impose an additional linear operation, eqn. (11) (where the operator <●> denotes a bounded value), on the ratio $\nabla \cdot ME_P(n)/\nabla \cdot \overline{ME}_P$ to obtain better control over its upper and lower bounds such that the ratio is upper bounded by $\alpha/c$, and lower bounded by $c/\alpha$.

$$\langle \Omega \rangle = \frac{\alpha \cdot \Omega + c}{c \cdot \Omega + \alpha} \quad (11)$$

For implementation purposes, one can start by setting $\alpha=5$ and $c=1$. Theoretically, the ratio multiplying the complexity of the I-frame should be very close to unity during the first four frames of a scene change GOP. One can simplify (8) and (9) by dropping the ratio. Given the non-linear and linear operations, and simplification, (1), (2), (3), (8) and (9) can be rewritten as (12), (13), (14), (15) and (16), respectively.

$$NP_I(n) = \left\langle \frac{\nabla \cdot Act(n)}{\nabla \cdot \overline{Act}} \right\rangle \cdot (X_I(m-1) + N_P \cdot \overline{X}_P + N_B \cdot \overline{X}_B) \cdot ADJ \quad (12)$$

$$NP_P(n) = \quad (13)$$
$$\left(\left\langle \frac{\nabla \cdot Act(n)}{\nabla \cdot Act(m)} \right\rangle \cdot X_I(m) + \left\langle \frac{\nabla ME_P(n)}{\nabla \cdot \overline{ME_P}} \right\rangle \cdot N_P \cdot \overline{X}_P + N_B \cdot \overline{X}_B\right) \cdot ADJ$$

$$NP_B(n) = \quad (14)$$
$$\left(\left\langle \frac{\nabla \cdot Act(n)}{\nabla \cdot Act(m)} \right\rangle \cdot X_I(m) + N_P \cdot \overline{X}_P + \left\langle \frac{\nabla ME_B}{\nabla \cdot \overline{ME_B}} \right\rangle N_B \cdot + \overline{X}_B\right) ADJ$$

$$NP_B(n)_{sc} = \left(X_I(m) + \left\langle \frac{\nabla ME_B(n)}{\nabla \cdot \overline{ME_B}} \right\rangle \cdot (N_P \cdot \overline{X}_P + N_B \cdot \overline{X}_B)\right) ADJ \quad (15)$$

$$NP_P(n)_{sc} = \left(X_I(m) + \left\langle \frac{\nabla ME_P(n)}{\nabla \cdot \overline{ME_P}} \right\rangle \cdot (N_P \cdot \overline{X}_P + N_B \cdot \overline{X}_B)\right) ADJ \quad (16)$$

$\chi$ in eqn. (10) is picture resolution-dependent. Actual experiments are required to optimize the value. However, half of the ME level picture resolution is recommended as a starting point.

In practice, with certain scenes, e.g., those having flashing lights, the need parameter oscillates per frame with a large dynamic range. In this case, it is more time critical to receive the additional bandwidth immediately as opposed to giving away surplus bandwidth. An adaptive temporal filtering, eqn. (17), applied to the calculated need parameter help to minimize the large oscillations while still preserving a quick response time for increasing needs in bandwidth.

$$NP'(n) = \begin{cases} 0.9 \cdot NP(n) + 0.1 \cdot NP(n-1); & NP(n) > NP(n-1) \\ 0.5 \cdot NP(n) + 0.5 + NP(n-1); & NP(n) < NP(n-1) \end{cases} \quad (17)$$

As mentioned previously, one can always bring in the two variables left out in the initial implementation for further performance tuning, i.e., $APL_{adj}$, the average pixel level adjustment, and $B_{adj}$, the buffer level adjustment.

Discussion of ME Scores

Generally, any type of ME score may be used with the present invention. One suitable ME score is the sum of the absolute values of the pixel-by-pixel differences between the current picture to be encoded and a motion-compensated prediction frame. The prediction frame could be constructed from a single previously-encoded picture, as in the P-frame type of motion estimation, or it could be constructed from two previously encoded pictures as in the B-frame type of motion estimation.

In a hierarchical motion estimation, where both the current picture and reference picture are decimated in size to produce successively smaller pictures for each level of the hierarchy, an exhaustive motion search is usually performed on the first level of the hierarchy whose picture sizes are the smallest. The best motion matches for every block on the first level are then passed onto the next level, where the motion search may center around the best matches. For each level, best matches are found for every block and the ME score from those matches are summed up for the entire frame. A hierarchical motion estimation may have an arbitrary number of levels, and the ME score from any one level may be used to represent the complexity of the current picture. The ME score from the last level of the hierarchy is usually preferred since it gives a more accurate representation of the difficulty in coding that picture. However, in many implementations, the ME score from the last level may not be available in time, so an earlier-level ME score is used.

1.0 Bandwidth Allocation for Encoding Bit Rate

The rate control processor collects the latest need parameters from all the video channels in the stat mux group. It also has access to the minimum and maximum bandwidth limits set by the user for each individual video channel. Prior to allocating encoding bit rates for each video channel, the rate control processor 125 sums up all the need parameters and assigns a need bit rate to each channel in proportion to the channel's need parameter.

In allocating encoding bit rates, the rate control processor 125 attempts to honor all minimum bandwidth limits first. If the sum total of all min. bandwidths exceeds the total video bandwidth given for the stat mux group, the rate control processor distributes the total video bandwidth amongst all the video channels in proportion to their min. bandwidth limits. Otherwise, each channel is given its user-requested min. bandwidth. That is, the human operator of the stat mux system may externally set a min. bandwidth requirement for each individual video channel.

The min. bandwidth assigned to any particular channel is subtracted from the need bit rate previously calculated for that channel, since this indicates a portion of the need had been satisfied. After allocating the min. bandwidths, any remaining video bandwidth is distributed to all the channels in proportion to their remaining needs, with the constraint that no channel can exceed its max. bandwidth limit.

If there is still video bandwidth left over (which is possible if one or more channels hit their max. bandwidth limits), the leftover bandwidth is distributed to those channels that have not yet hit their max. bandwidth limit. This distribution is made according to (the channel's need parameter/total_sneed_param). The term total_sneed_param refers to the sum of the need parameters belonging to those channels that have not reached their max. bandwidth limit.

1.1 A C-Language Syntax for Assigning an Encoding Bit Rate in Accordance With the Invention The syntax should be self-explanatory to those skilled in the art. The following notation is used in naming the parameters: avail—available, br—bit rate, dmin—difference in minimum, hmin—hard minimum, max—maximum, mem—member, min—minimum, nom—nominal, num—number, param—parameter, rem—remaining, req—requested, sav—still available, sneed—scaled need, tot—total.

(1) Initially assign a nominal bit rate to each stat mux group member's (channel's) encoding_br and need_br:

```
for (i=0; i<num_mem; i++){
    need_br[i] = nom_br;
    encoding_br[i] = nom_br;
    br_avail = br_avail - nom_br;
}
```

(2) Calculate the total need parameter:

```
tot_need_param = 0;
for (i=0; i<num_mem; i++)
    tot_need_param = tot_need_param + need_param[i];
```

(3) Calculate the need_br for each channel by distributing the available bit rate among the channels of the statistical group in proportion to their need parameter.

```
for (i=0; i<num_mem; i++){
    if (tot_need_param != 0)
        need_br[i] = br_avail * need_param[i]/tot_need_param;
    else
        need_br[i] = 0;
}
```

(4) Check if total_user_min in the group exceeds the total group bit rate. If so, distribute the available bit rate among the channels of the statistical group in proportion to their user_min. The user, such as the stat mux operator can set a max (user_max) and min (user_min) for the encoding bit rate for each channel. Moreover, a higher-priority channel may receive higher user_max and/or user_min values.

```
for (i=0; i<num_mem; i++)
    tot_min = tot_min + user_min[i];
if (tot_min > br_avail){
    for (i=0; i<num_mem; i++)
        encoding_br[i] = br_avail * user_min[i]/tot_min;
    br_avail = 0;
}
```

(5) Otherwise, allocate the user minimum requested to each member's encoding bit rate and adjust the available bit rate accordingly.

```
if (br_avail > 0){
    tot_rem_br_req = 0;
    for (i=0; i<num_mem; i++){
        encoding_br[i] = user_min[i];
        br_avail = br_avail - user_min[i];
        need_br[i] = need_br[i] - user_min[i];
        if (need_br[i] < 0)
            need_br[i] = 0;
        tot_rem_br_req = tot_rem_br_req + need_br[i];
    }
}
```

(6) The remaining available bit rate is distributed among the members of the statistical group in proportion to their remaining need.

```
if (br_avail > 0){
    br_remain = br_avail;
    for (i=0; i<num_mem; i++){
        if (tot_rem_br_req != 0){
            encoding_br[i] = encoding_br[i] + br_avail * need_br[i]/tot_rem_br_req;
            br_remain = br_remain - (br_avail * need_br[i]/tot_rem_br_req);
        }
        if (encoding_br[i] >= user_max[i]){
            encoding_br[i] = user_max[i];
            br_remain = br_remain + (encoding_br[i] - user_max[i]);
        }
    }
}
```

(7) Next, distribute the remaining bit rate in proportion to the scaled_need_param without exceeding the user-defined maximum bit rate for the channel.

```
br_left = br_remain;
if (br_remain>0){
    for (i=0; i<num_mem; i++){
        if (encoding_br[i] < user_max[i])
            tot_sneed_param = need_param[i];
    }
    if (tot_sneed_param != 0){
        for (i=0;i<num_mem;i++){
            if (encoding_br[i] < user_max[i]){
                encoding_br[i] = encoding_br[i] + br_remain *
scaled_need_param[i]/tot_need_param;
                br_left = br_left - (br_remain *
scaled_need_param[i]/tot_need_param);
            }
            if (encoding_br[i] > user_max[i]){
                encoding_br[i] = user_max[i];
                br_left = br_left + (encoding_br[i]-user_
                max[i]);
            }
        }
    }
}
```

(8) Finally, distribute the remaining the bit rate in proportion to how much room is left in each channel without exceeding the user defined maximum bit rate for the channel.

```
if (br_remain> 0){
    tot_leftover = 0;
    for (i=0;i<num_mem;i++)
        tot_leftover = tot_leftover + user_max[i] - encoding_
        br[i];
    if (tot_leftover != 0){
        for (i=0;i<num_mem;i++)
            encoding_br[i] = encoding_br[i] + br_
            remain * (user_max[i] -
encoding_br[i])/tot_leftover;
    }
} /* end (if br_avail >0) from 6 */
```

Figure 4:
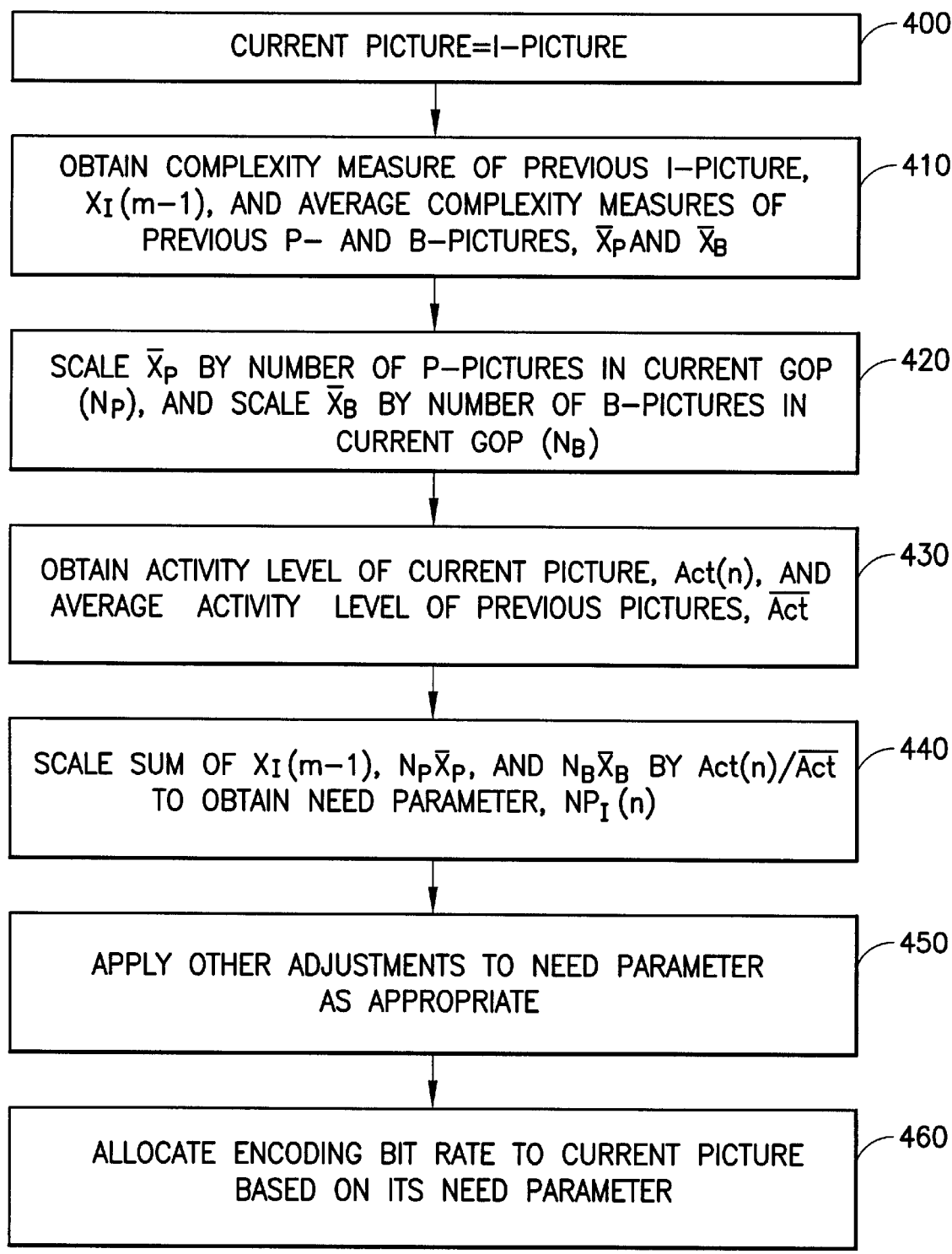
FIG. 4 illustrates a method for obtaining a need parameter for an I-picture in accordance with the present invention.

FIG. 4 illustrates a method for obtaining a need parameter for an I-picture in accordance with the present invention. A summary of one possible approach is shown.

For a current picture which is an I-picture (block 400), a complexity measure is obtained of a previous I-picture (e.g., in a previous GOP), and average complexity measures of a number of previous P- and B-pictures are obtained (block 410). The average complexity measures are scaled by the number of the associated picture type in the current GOP (block 420). An activity level of the current I-picture, and an average activity level of a number of previous pictures (typically P- and B-pictures) are obtained (block 430). The need parameter $NP_I(n)$ is obtained by scaling the values obtained by an activity level ratio (block 440). Other adjustments, such as for a fade, etc., can also be applied to the need parameter, if appropriate (block 450), and, finally, an encoding bit rate is allocated to the current I-picture based on its need parameter (block 460).

Figure 5:
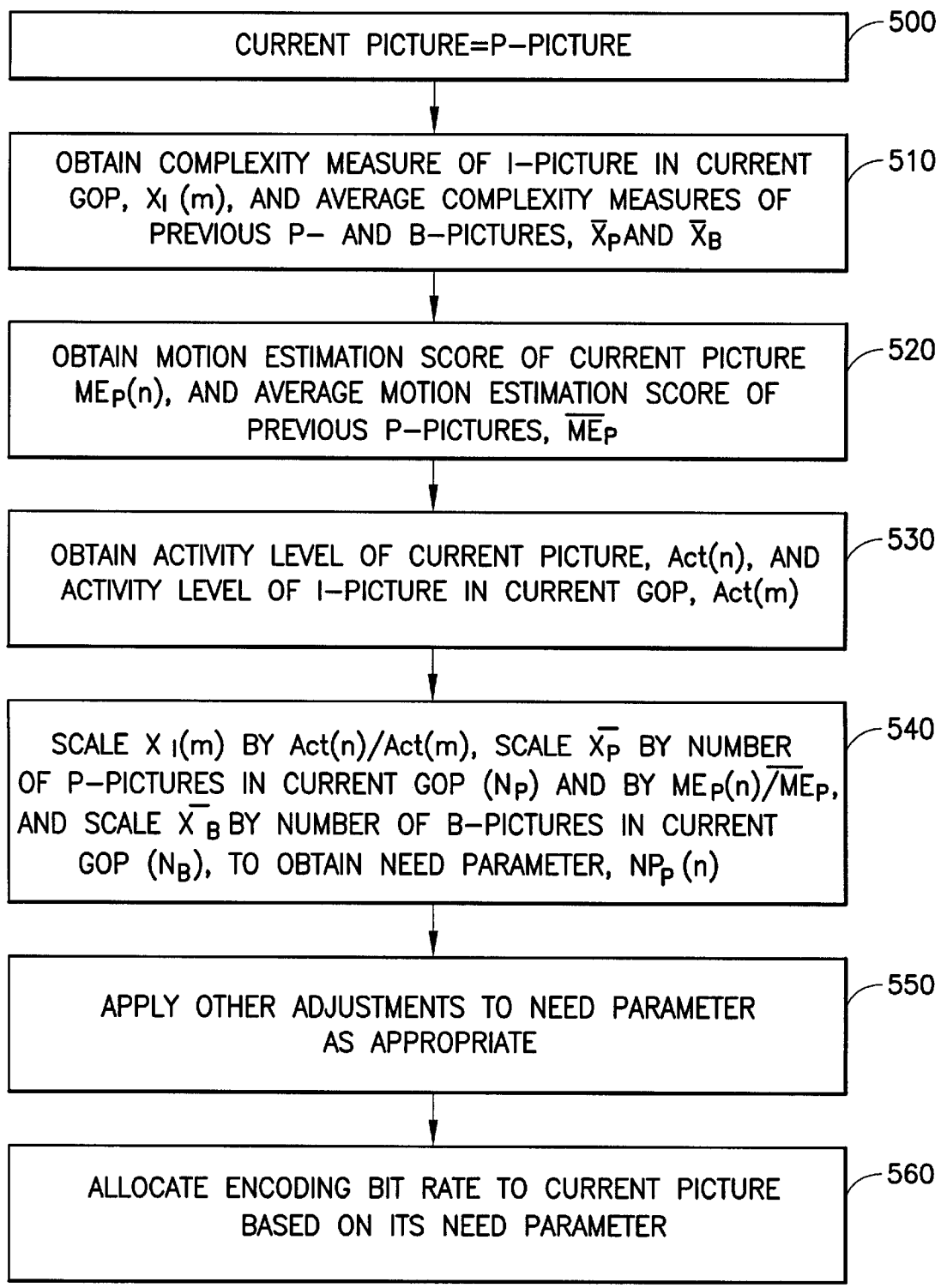
FIG. 5 illustrates a method for obtaining a need parameter for an P-picture in accordance with the present invention.

FIG. 5 illustrates a method for obtaining a need parameter for an P-picture in accordance with the present invention. A summary of one possible approach is shown.

For a current picture which is a P-picture (block 500), a complexity measure is obtained of the I-picture in the current GOP, and average complexity measures of a number of previous P- and B-pictures are obtained (block 510). A motion estimation score of the current picture, and an average motion estimation score of a number of previous P-pictures are obtained (block 520). An activity level of the current P-picture, and an activity level of the I-picture in the current GOP are obtained (block 530). To obtain the need parameter $NP_P(n)$ for the current P-picture, the complexity of the I-picture is scaled by a ratio of the activity levels, the average complexity measure of the previous P-pictures is scaled by the number of P-pictures in the current GOP and by a ratio of the motion estimation scores, and the average complexity measure of the previous B-pictures is scaled by the number of B-pictures in the current GOP (block 540). Other adjustments can also be applied to the need parameter, if appropriate (block 550), and, finally, an encoding bit rate is allocated to the current P-picture based on its need parameter (block 560).

Figure 6:
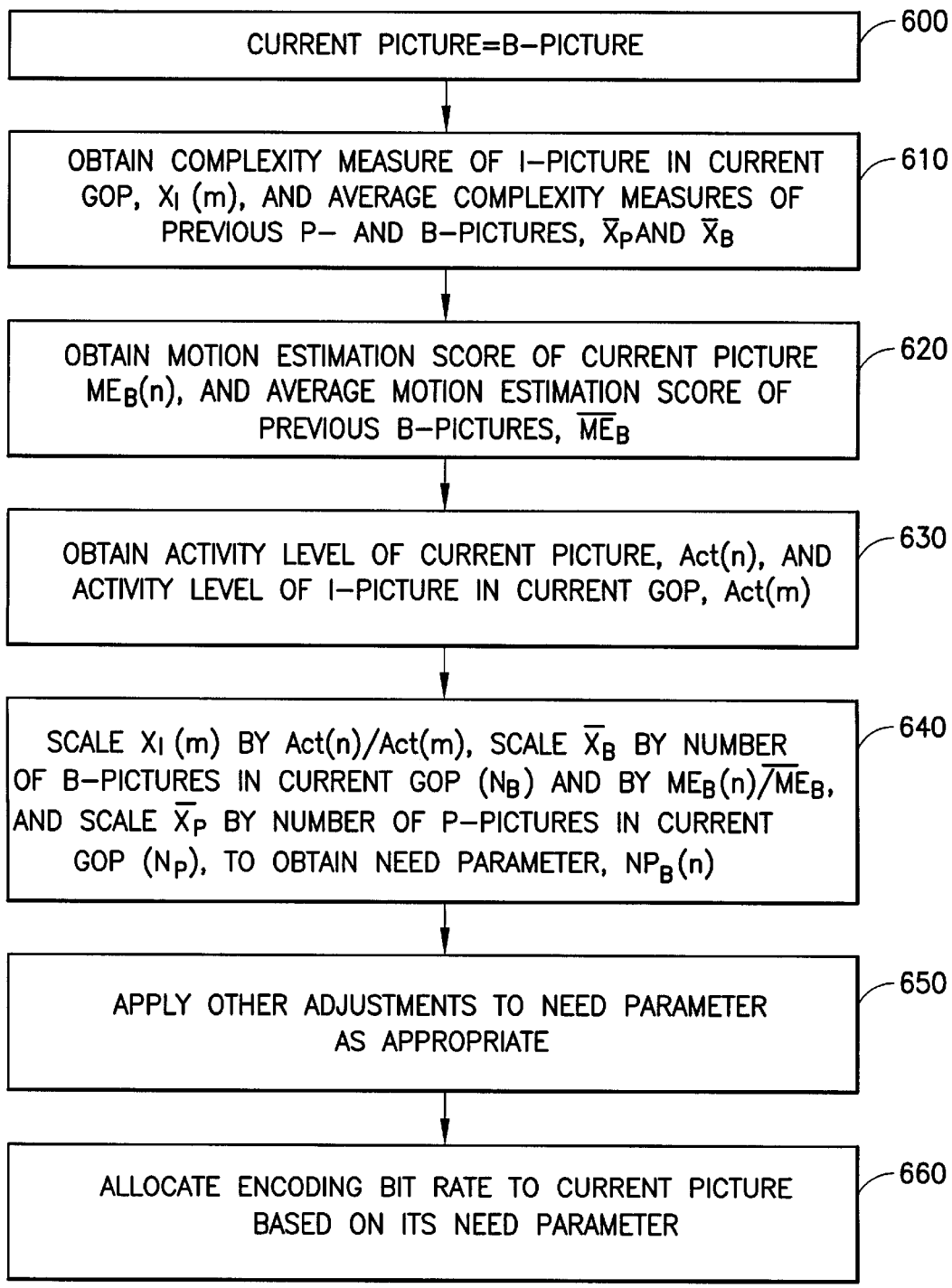
FIG. 6 illustrates a method for obtaining a need parameter for an B-picture in accordance with the present invention.

FIG. 6 illustrates a method for obtaining a need parameter for an B-picture in accordance with the present invention. A summary of one possible approach is shown.

For a current picture which is a B-picture (block 600), a complexity measure is obtained of the I-picture in the current GOP, and average complexity measures of a number of previous P- and B-pictures are obtained (block 610). A motion estimation score of the current picture, and an average motion estimation score of a number of previous B-pictures are obtained (block 620). An activity level of the current B-picture, and an activity level of the I-picture in the current GOP are obtained (block 630). To obtain the need parameter $NP_B(n)$ for the current B-picture, the complexity of the I-picture is scaled by a ratio of the activity levels, the average complexity measure of the previous B-pictures is scaled by the number of B-pictures in the current GOP and by a ratio of the motion estimation scores, and the average complexity measure of the previous P-pictures is scaled by the number of P-pictures in the current GOP (block 640). Other adjustments can also be applied to the need parameter, if appropriate (block 650), and, finally, an encoding bit rate is allocated to the current B-picture based on its need parameter (block 660).

Accordingly, it can be seen that the present invention provides a statistical multiplexer for coding and multiplexing multiple channels of digital television data. A bit rate need parameter is determined for each encoder in a stat mux group by scaling the complexities of previous pictures of the same and different picture types. Scaling factors based on an activity level, motion estimation score, and number of pictures of a certain type in a GOP, may be used. Moreover, the scaling factors may be bounded based on a linear or non-linear operator to prevent large variations in the factors. An encoding bit rate is allocated to each channel based on its need parameter.

Although the invention has been described in connection with various preferred embodiments, it should be appreciated that various modifications and adaptations may be made thereto without departing from the scope of the invention as set forth in the claims.

What is claimed is:

1. A method for allocating bits in a statistical multiplexer for coding a plurality of channels of video data sources comprising respective video pictures, comprising the steps of:

for each channel, obtaining a bit rate need parameter for a current picture, which has an associated picture type, by scaling at least one complexity measure that is based on at least one previous picture of the same type, and by scaling at least one complexity measure that is based on at least one previous picture of a different type; and allocating an encoding bit rate for coding the current picture of each channel according to the bit rate need parameter thereof.

2. The method of claim 1, wherein:

for at least one of the channels, when the current picture is an I-picture, the bit rate need parameter thereof is obtained by scaling a complexity measure of a previous I-picture, an average complexity measure for a plurality of previous P-pictures, and an average complexity measure for a plurality of previous B-pictures.

3. The method of claim 2, wherein:
for at least one of the channels, the complexity measure of the previous I-picture is scaled according to a ratio of: (a) an activity level of the current picture to (b) an average activity level of a plurality of previous pictures.

4. The method of claim 2, wherein:
the average complexity measure of the plurality of previous P-pictures is scaled according to a number of P-pictures in a current group of pictures (GOP).

5. The method of claim 2, wherein:
the average complexity measure of the plurality of previous B-pictures is scaled according to a number of B-pictures in a current group of pictures (GOP).

6. The method of claim 1, wherein:
for at least one of the channels, when the current picture is a P-picture, the bit rate need parameter thereof is obtained by scaling a complexity measure of an I-picture in a current group of pictures (GOP), an average complexity measure for a plurality of previous P-pictures, and an average complexity measure for a plurality of previous B-pictures.

7. The method of claim 6, wherein:
the complexity measure of the I-picture is scaled according to a ratio of: (a) an activity level of the current picture to (b) an activity level of the I-picture.

8. The method of claim 6, wherein:
the average complexity measure for the plurality of previous P-pictures is scaled according to a ratio of: (a) a motion estimation score of the current picture to (b) an average motion estimation score for the plurality of previous P-pictures.

9. The method of claim 6, wherein:
the average complexity measure for the plurality of previous P-pictures is scaled according to a number of P-pictures in the current GOP.

10. The method of claim 6, wherein:
the average complexity measure for the plurality of previous B-pictures is scaled according to a number of B-pictures in the current GOP.

11. The method of claim 1, wherein:
for at least one of the channels, when the current picture is a B-picture, the bit rate need parameter thereof is obtained by scaling a complexity measure of an I-picture in a current group of pictures (GOP), an average complexity measure for a plurality of previous P-pictures, and an average complexity measure for a plurality of previous B-pictures.

12. The method of claim 11, wherein:
the complexity measure of the I-picture is scaled according to a ratio of: (a) an activity level of the current picture to (b) an activity level of the I-picture.

13. The method of claim 11, wherein:
the average complexity measure for the plurality of previous P-pictures is scaled according to a number of P-pictures in the current GOP.

14. The method of claim 11, wherein:
the average complexity measure for the plurality of previous B-pictures is scaled according to a ratio of: (a) a motion estimation score of the current picture to (b) an average motion estimation score for the plurality of previous B-pictures.

15. The method of claim 11, wherein:
the average complexity measure for the plurality of previous B-pictures is scaled according to a number of B-pictures in the current GOP.

16. The method of claim 1, wherein:
for at least one of the channels, when the current picture is a P-picture in a scene change group of pictures (GOP), the bit rate need parameter thereof is obtained by scaling an average complexity measure for a plurality of previous P-pictures, and an average complexity measure for a plurality of previous B-pictures, by a ratio of (a) a motion estimation score of the current picture to (b) an average motion estimation score for the plurality of previous P-pictures.

17. The method of claim 1, wherein:
for at least one of the channels, when the current picture is a B-picture in a scene change group of pictures (GOP), the bit rate need parameter thereof is obtained by scaling an average complexity measure for a plurality of previous P-pictures, and an average complexity measure for a plurality of previous B-pictures, by a ratio of (a) a motion estimation score of the current picture to (b) an average motion estimation score for the plurality of previous B-pictures.

18. The method of claim 1, comprising the further step of:
for at least one of the channels, bounding at least one of the scaled complexity measures according to at least one of a non-linear and linear function.

19. The method of claim 1, comprising the further step of:
for at least one of the channels, temporally filtering the need parameters for a channel to reduce picture-to-picture fluctuations thereof.

20. The method of claim 1, comprising the further step of:
for at least one of the channels, providing an adjustment factor for the need parameter for at least one of fading, low brightness level, low amount of movement, and fullness level of a buffer that receives the pictures after coding thereof.

21. The method of claim 20, wherein:
the adjustment factor increases the need parameter for at least one of fading, low brightness level, and low amount of movement.

22. The method of claim 1, wherein:
at least one of the channels comprises high-definition television (HDTV) data;
the current picture of the HDTV channel is sub-divided into panels that are encoded in parallel at respective encoders;
a bit rate need parameter is obtained for each panel; and
a bit rate need parameter of the HDTV channel is obtained by summing the bit rate need parameters of each panel thereof.

23. The method of claim 1, wherein:
for at least one of the channels, the bit rate need parameter is obtained, at least in part, by scaling a weighted average of complexity measures for a plurality of previous pictures.

24. An apparatus for allocating bits in a statistical multiplexer for coding a plurality of channels of video data sources comprising respective video pictures, comprising:
means for obtaining, for each channel, a bit rate need parameter for a current picture, which has an associated picture type, by scaling at least one complexity measure that is based on at least one previous picture of the same type, and by scaling at least one complexity measure that is based on at least one previous picture of a different type; and means for allocating an encoding bit rate for coding the current picture of each channel according to the bit rate need parameter thereof.

25. The apparatus of claim 24, wherein:

for at least one of the channels, when the current picture is an I-picture, the bit rate need parameter thereof is obtained by scaling a complexity measure of a previous I-picture, an average complexity measure for a plurality of previous P-pictures, and an average complexity measure for a plurality of previous B-pictures.

26. The apparatus of claim 25, wherein:

for at least one of the channels, the complexity measure of the previous I-picture is scaled according to a ratio of: (a) an activity level of the current picture to (b) an average activity level of a plurality of previous pictures.

27. The apparatus of claim 25, wherein:

the average complexity measure of the plurality of previous P-pictures is scaled according to a number of P-pictures in a current group of pictures (GOP).

28. The apparatus of claim 25, wherein:

the average complexity measure of the plurality of previous B-pictures is scaled according to a number of B-pictures in a current group of pictures (GOP).

29. The apparatus of claim 24, wherein:

for at least one of the channels, when the current picture is a P-picture, the bit rate need parameter thereof is obtained by scaling a complexity measure of an I-picture in a current group of pictures (GOP), an average complexity measure for a plurality of previous P-pictures, and an average complexity measure for a plurality of previous B-pictures.

30. The apparatus of claim 29, wherein:

the complexity measure of the I-picture is scaled according to a ratio of: (a) an activity level of the current picture to (b) an activity level of the I-picture.

31. The apparatus of claim 29, wherein:

the average complexity measure for the plurality of previous P-pictures is scaled according to a ratio of: (a) a motion estimation score of the current picture to (b) an average motion estimation score for the plurality of previous P-pictures.

32. The apparatus of claim 29, wherein:

the average complexity measure for the plurality of previous P-pictures is scaled according to a number of P-pictures in the current GOP.

33. The apparatus of claim 29, wherein:

the average complexity measure for the plurality of previous B-pictures is scaled according to a number of B-pictures in the current GOP.

34. The apparatus of claim 24, wherein:

for at least one of the channels, when the current picture is a B-picture, the bit rate need parameter thereof is obtained by scaling a complexity measure of an I-picture in a current group of pictures (GOP), an average complexity measure for a plurality of previous P-pictures, and an average complexity measure for a plurality of previous B-pictures.

35. The apparatus of claim 34, wherein:

the complexity measure of the I-picture is scaled according to a ratio of: (a) an activity level of the current picture to (b) an activity level of the I-picture.

36. The apparatus of claim 34, wherein:

the average complexity measure for the plurality of previous P-pictures is scaled according to a number of P-pictures in the current GOP.

37. The apparatus of claim 34, wherein:

the average complexity measure for the plurality of previous B-pictures is scaled according to a ratio of: (a) a motion estimation score of the current picture to (b) an average motion estimation score for the plurality of previous B-pictures.

38. The apparatus of claim 34, wherein:

the average complexity measure for the plurality of previous B-pictures is scaled according to a number of B-pictures in the current GOP.

* * * * *